June 11, 1968 | R. J. CAMPANA ET AL | 3,388,008

THERMOELECTRIC GENERATOR

Filed April 27, 1965 | 2 Sheets-Sheet 1

Inventors
ROBERT J. CAMPANA
JOSEPH C. MELCHER
PETER S. MERRILL
WALTER E. SARGENT By [signature]
Atty June 11, 1968 R. J. CAMPANA ET AL 3,388,008

THERMOELECTRIC GENERATOR

Filed April 27, 1965 2 Sheets-Sheet 2

Inventors
ROBERT J. CAMPANA
JOSEPH C. MELCHER
PETER S. MERRILL
WALTER E. SARGENT By Roland A. Anderson
Atty United States Patent Office
3,388,008
Patented June 11, 1968

3,388,008

THERMOELECTRIC GENERATOR

Robert J. Campana, Solana Beach, Joseph C. Melcher, El Cajon, and Peter S. Merrill and Walter E. Sargent, San Diego, Calif., assignors, by mesne assignments, to the United States of America as represented by the United States Atomic Energy Commission Filed Apr. 27, 1965, Ser. No. 451,367
10 Claims. (Cl. 136—205)

This invention relates generally to electrical generators and, more specifically, to generators in which heat is directly converted to electricity by thermoelectric means.

Thermoelectric generators such as, for example, radioisotope-powered and solar-powered thermoelectric generators, have been developed for the purpose of providing self-contained power systems which are capable of continuous operation for extended periods of time under widely varying environmental conditions. Such generators are particularly useful in remote or inaccessible installations such as unmanned arctic or marine weather stations, surface or underwater navigation aids, space vehicles and lunar installations where maintenance and fuel replacement are difficult, hazardous, or impossible.

Various factors such as power output, terminal voltage, size, weight, operating life, efficiency, cost and reliability under various environmental conditions are important considerations in the design of an acceptable thermoelectric generator. In certain space vehicle applications, for example, it is necessary to provide a compact, lightweight, low-powered generator which can withstand severe mechanical shock, vibration and acceleration, which will function in a vacuum and at extreme temperatures and which will provide stable power output at constant voltage for long periods and during rapid changes in ambient temperature. For such applications, thermoelectric generators utilizing heat produced by the decay of a radioactive isotope have been found to be superior to other types of generators because of their reliability, small size, light weight and efficiency.

One major problem which has not been overcome by previously designed thermoelectric generators is the fluctuation of terminal voltage and power output caused by rapid changes in ambient temperature. Ordinarily a change in the ambient temperature will cause a change in the temperatures of the hot and cold junctions of the thermoelectric elements. However, because of the differences in geometry and materials of the structures surrounding the two junctions, the rate of change of temperature at one junction will differ from that at the other junction. These differing rates of temperature change cause the temperature differential between the junctions to vary and, since the terminal voltage of the generator is dependent upon the temperature differential cause the voltage and power output to vary as well.

Accordingly, the need has arisen for a thermoelectric generator in which power output is stable during rapid ambient temperature fluctuations. Such a generator would be useful in providing a steady reference voltage for long periods and in powering remote weather and detection stations, low-power communication systems and radio beacons for lunar landing areas as well as in space vehicles.

It is therefore an important object of this invention to provide an improved thermoelectric generator which will produce stable power output during rapid ambient temperature changes.

Another object of the invention is to provide an improved thermoelectric generator which will produce stable power output for long periods of time without requiring repair or replacement of parts or replacement of fuel.

A further object of the invention is to provide a compact, lightweight radioisotope-powered thermoelectric generator which will withstand severe mechanical vibration, shock and acceleration.

A still further object of the invention is to provide an improved radioisotope-powered thermoelectric generator which will operate reliably at extremely low ambient temperatures where chemical batteries may become inoperative or require auxiliary systems for start-up or operation.

Yet another object of the invention is to provide an improved radioisotope-powered thermoelectric generator which will operate reliably in a vacuum and underwater as well as in air.

An additional object of the invention is to provide a method for fabricating thermoelectric elements from very small diameter wire in modular form for use in a thermoelectric generator, thus improving the reliability of the generator and minimizing scrappage loss during fabrication.

Other objects and advantages of the invention will become apparent from the following description of an embodiment thereof, when considered in conjunction with the accompanying drawings in which.

Figure 2:
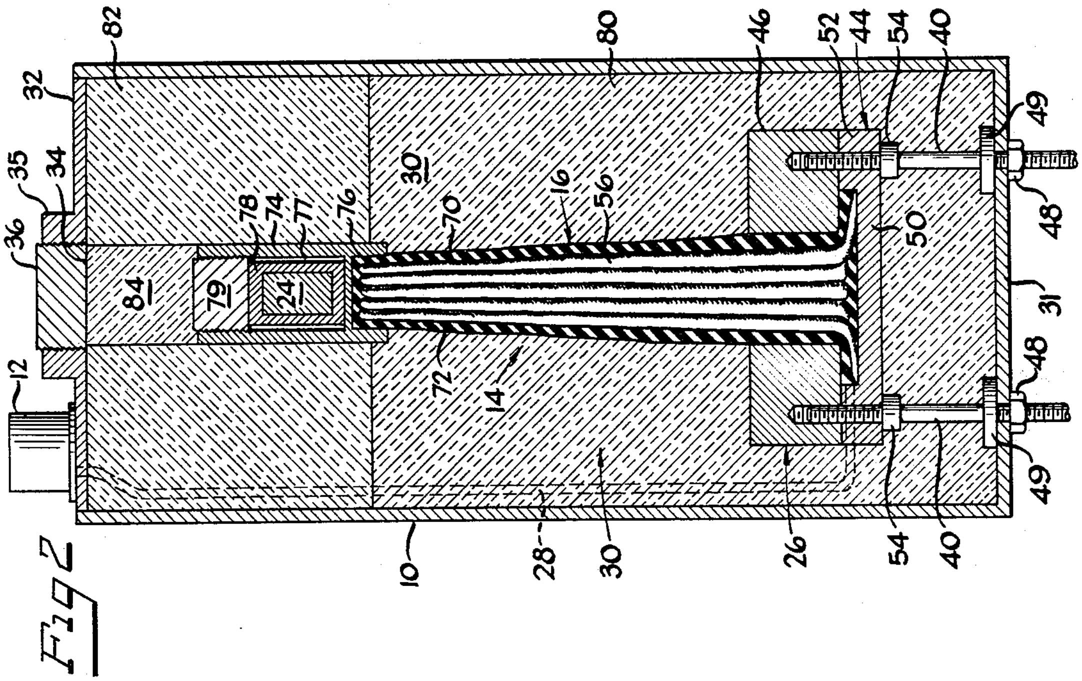
FIGURE 2 is a sectional elevational view taken along line 2—2 of FIGURE 1.
Figure 1:
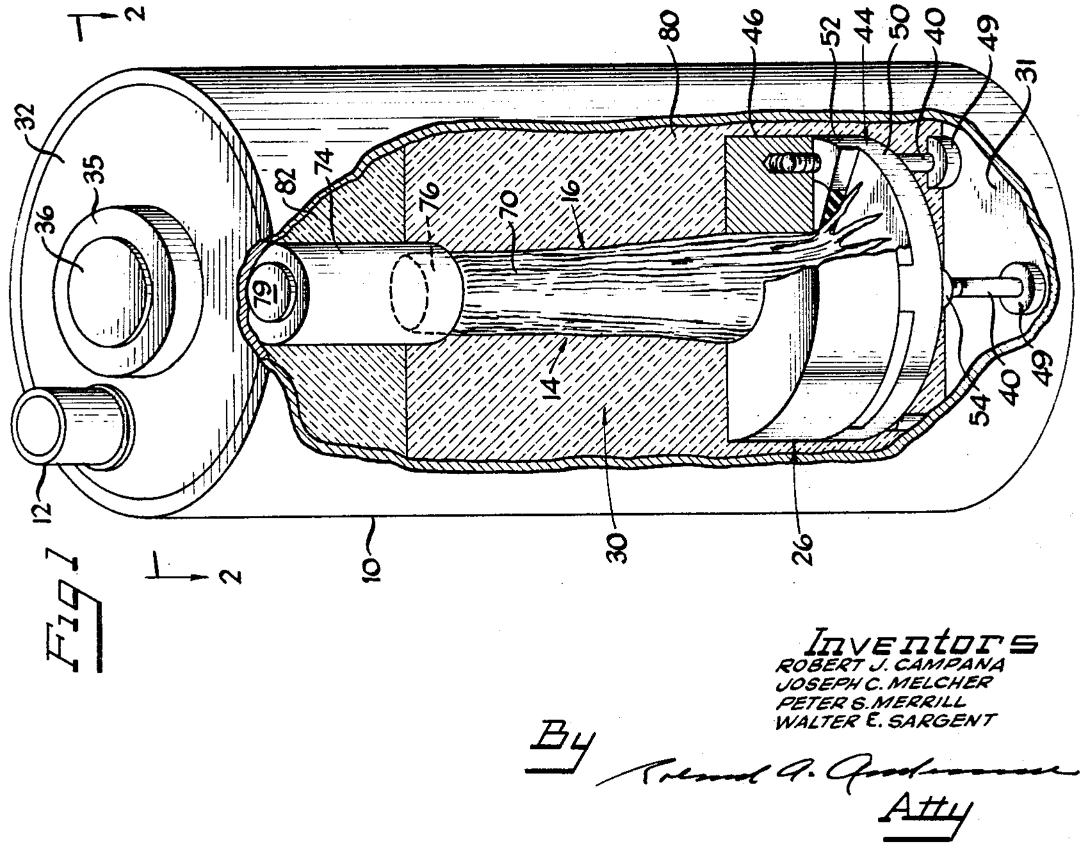
FIGURE 1 is a partially broken away perspective view of a radioisotope-powered thermoelectric generator showing various of the features of the invention.

In general, the thermoelectric generator, shown in the illustrated embodiment of the invention includes a housing 10 which is provided with an electrical output connection 12 and which encloses a generator assembly 14. The generator assembly includes an elongated thermopile 16 formed of a plurality of P-type thermoelectric elements 17 and N-type thermoelectric elements 18 (FIG. 3) electrically connected at hot junctions 20 disposed at one end of the thermopile and cold junctions 22 disposed at the opposite end of the thermopile, thus forming a plurality of thermoelement pairs 23 which are electrically connected together in a manner to be hereinafter described. The hot junctions 20 are thermally connected to a quantity of radioactive fuel 24 which supplies heat thereto; the cold junctions 22 are thermally connected to the housing 10 through studs 40 and a thermal capacitor 26 in the form of a relatively large mass of a material having high thermal capacity and low thermal resistivity. The thermopile 16 is electrically connected to the electrical output connection 12 by tap-off leads 28. Thermal insulation 30 fills the remaining space within the housing 10 and minimizes the flow of heat between the fuel and the housing and from the fuel to the cold junctions. The thermal insulation 30 also strengthens the housing 10 and mechanically supports the generator assembly and thermal capacitor 26.

In operation of the generator, the radioactive decay of the fuel 24 generates heat which is transmitted to the hot junctions 20 of the thermoelement pairs 23. The cold junctions 22 are maintained at a lower temperature than the hot junctions 20 by the low thermal resistance of the thermal capacitor 26 and studs 40 which connect the cold junctions to the housing 10 and the high thermal resistance of the thermal insulation 30 adjacent to the fuel 24 and hot junctions which minimizes the flow of heat from the fuel 24 to the cold junctions and the housing. Because of this temperature difference, an electromotive force is produced in the thermoelement pairs in accordance with the well known Seebeck thermoelectric effect so as to cause a voltage drop across the terminals of the thermopile 16. The magnitude of this voltage drop depends, of course, upon the temperature difference between the hot and cold junctions.

Referring now in detail to the drawings, the illustrated housing 10 is generally cylindrical in shape and, as shown, is positioned with its longitudinal axis vertically disposed. The lower end of the housing is closed by an integral bottom wall 31 and its upper end is closed by a top wall 32 which is hermetically sealed in place after the internal components have been positioned within the housing. The top wall 32 has the electrical output connection 12 mounted thereon and is provided with an axially arranged fuel access port 34 surrounded by an internally threaded rim 35. The port is closed by a cap 36 which is threaded and seated in the rim. The housing 10, including the top wall 32 and cap 36, is made of a lightweight metal with high thermal conductivity such as aluminum.

Changes in ambient temperature cause the temperatures of the hot and cold junctions 20 and 22 respectively to change at rates determined by the thermal time constants of the structures surrounding them. In order for the temperature difference between the junctions and, hence, the voltage drop across the thermopile terminals, to remain stable during such changes in ambient temperature, the thermal time constants of the structures adjacent to and including the hot and cold junctions respectively must be equal. The thermal time constant of a structure is equal to the product of its thermal resistance and its thermal capacitance.

In the illustrated embodiment, the temperature difference between the hot and cold junctions is maintained by the high thermal resistance of the structures adjacent to the hot junctions and fuel and by the low thermal resistance of the structures adjacent to the cold junctions. Therefore, in order for the thermal time constants to be equal, the thermal capacitance at the cold junctions must be proportionately higher than the thermal capacitance at the hot junctions. This result is achieved by placing a relatively large mass of a material having high thermal capacity, referred to as the thermal capacitor 26, adjacent to the cold junctions.

Accordingly, the thermal capacitor 26 of the generator assembly 14, located in the lower portion of the housing, comprises a disk 44 and an overlying ring 46. The thermal capacitor 26 is thermally connected to and partially supported by a plurality of studs 40. These studs are in turn thermally connected to the bottom wall 31 of the housing 10. The cold junctions 22 of the thermoelement pairs are thermally connected to the ring 46 in a manner to be hereinafter described. The studs, disk and ring are preferably formed of a material such as stainless steel having low thermal resistivity, high thermal capacity, rigidity and high impact strength. Thus, due to the path of low thermal resistance which the thermal capacitor 26 and the studs 40 provide between the housing 10 and the cold junctions of the thermoelement pairs, the cold junctions are maintained at a temperature lower than the hot junctions 20. In addition, due to the high thermal capacity of the material forming the thermal capacitor 26, the thermal capacitance at the cold junctions 22 is large compared to the thermal capacitance at the hot junctions 20, thereby minimizing or eliminating changes in the temperature drop between the hot and cold junctions during changes in ambient temperature.

More specifically, the studs 40, which thermally connect the ring and disk to the housing 10 and which also provide support for the generator assembly 14 due to their rigidity and high impact strength, are in the form of bolts with shoulders and threads at each end and securely attached to the bottom wall 31 of the housing 10 by nuts 48. The lower shoulders 49 and upper shoulders 54 maintain a fixed distance between the bottom wall 31 and the disk 44. Thus, the lower ends of the studs project through and are located outside of the housing 10 and serve as a base on which the generator rests or means by which it may be attached to a suitable base. In the illustrated embodiment, the studs are spaced at 90 degree intervals on the circumference of a circle, the center of which lies on the axis of the housing 10.

The disk 44 is supported by the studs adjacent their upper ends and comprises a circular plate 50 having its center on the axis of the housing 10 and oriented in a horizontal plane. The upper surface of the disk is provided with upwardly projecting spacers 52 which are integral with the plate 50 and are located at 90 degree intervals on its circumference. Extending vertically through the plate 50 and spacers 52 are suitably threaded holes which receive the studs 40. The upper shoulders 54 located below the disk limit the extent to which the bolts extend above the spacers. The ring 46, which is also coaxial with the housing 10, rests on the spacers 52 and is securely attached to the disk by the studs which are received into threaded holes extending vertically into the ring from its lower surface. The spacers 52 therefore cause the ring 46 and disk 44 to define a space therebetween which receives a portion of the lower end of the thermopile 16, as hereinafter described.

Since the temperature difference between the hot and cold junctions 20 and 22 of the thermoelement pairs of the thermopile 16 is maintained by the thermal insulations 30 adjacent to the hot junctions, the temperature drop is maximized by increasing the amount of thermal insulation between the hot junctions and the cold junctions. This is made possible by fabricating the thermopile 16 in the form of an elongated resilient stem extending upwardly from the disk 44 through the ring 46 in generally coaxial relation to the housing 10, which the hot junctions 20 disposed at its upper end and the cold junctions 22 disposed at its lower end. The thermopile 16 is formed of a plurality of the P-type thermoelectric elements 17 and an equal number of the N-type elements 18, each of which is in the form of a thin wire arranged generally longitudinally in the thermopile 16, thus permitting their interconnection at oppoiste ends of the thermopile. The elements 17 and 18 are made of dissimilar pairs of materials such as Chromel-P and Constantan or Tophel Special and Cupron Special, although other dissimilar pairs of materials may be used.

The elements 17 and 18 are electrically interconnected to form the thermoelement pairs 34 which, in turn, are electrically interconnected in series to form thermobundles 56. The thermobundles are electrically interconnected in parallel to form thermobundle sets 58 which are, in turn, electrically interconnected in series with each other and to the tap-off leads 28. These multiple interconnections within a very small volume are facilitated by the fabrication of the thermoelements in the form of thin wires.

The above-described form of electrical interconnection increases the reliability of the generator assembly 14 by minimizing the effects of short circuiting or open circuiting of individual thermoelement pairs 23.

The thermoelectric elements 17 and 18 are each in the form of elongated wires covered with a coating 59 of electrical insulation such as a high temperature electrical varnish, which prevents contact between their median portions when the elements are arranged in closely adjacent relation within the thermopile. One of each of the elements 17 and 18 form one of the thermoelement pairs 23 by virtue of the interconnection of one of their adjacent ends to form one of the hot junctions 20. The thermoelectric elements 17 and 18 of a thermoelement pair 23 thus extend from a common hot junction 20.

The thermobundles 56 are formed by the open-ended series connection of a plurality of the thermoelectric pairs 23. The series interconnection is accomplished by joining the unconnected end of an element 17 of a pair 23 to the unconnected end of an element 18 of another pair 23. This joining of elements defines the cold junctions 22. While the hot junctions 22 do not differ physically from the cold junctions 20, these junctions are referred to as hot and cold respectively, in accordance with their ultimate relationship to the fuel 24 and thermal capacitor 26, for clarity of description.

The thermoelement pairs 23 forming each thermobundle 56 are compactly arranged in side-by-side relation with their hot junctions 20 and cold junctions 22 respectively adjacent each other to provide the thermobundle with an elongated configuration. When so arranged, the coating 59 of the elements 17 and 18 electrically insulates the median portions thereof from one another. The hot and cold junctions 20 and 22, located at opposite ends of the thermobundle are coated with a thin coating of electrical insulation 60 which, although electrically insulating the junctions at each end from one another, provides only a minimal thermal resistance. A silicon elastomer has been found to be a suitable coating for these junctions.

It will be appreciated that each thermobundle 56 is formed of an open-ended series connection of the thermoelectric pairs 23 so as to provide a P-type thermoelectric element 17 extending from one of the hot junctions 20 at one end, but otherwise unconnected, and an N-type thermoelectric element 18 extending from another of the hot juntcions 20, but otherwise unconnected. These unconnected end elements are each connected to a P-end lead wire 64 and an N-end lead wire respectively and the thermobundle is then enveloped in an electrically insulated material having low thermal resistance such as a silicon elastomer. The lead wires 64 and 66 project from one end of the bundle, however, and are preferably formed of a larger diameter wire than that of the thermoelements to facilitate interconnection of the thermobundles with each other, as hereinafter set forth.

A plurality of thermobundles 56 are electrically interconnected in parallel to form a thermobundle set 58 by the interconnection of all of the P-end lead wires 64 of the plurality of thermobundles to each other and by a similar interconnection of all of the N-end lead wires 66 of the plurality of thermobundles to each other, thus providing the thermobundle set with a pair of leads 64A and 66A formed by the interconnection. A plurality of the thermobundle sets 58 are electrically connected in series by the alternate interconnection of the leads 64A and 66A of the sets 70, with at least one lead 64A and one lead 66A being connected to tap-off leads 28 extending to the output connection 12. If desired, a tap-off lead might also extend from any of the junctions formed by the interconnection of the lead wires 64A and 66A to provide a plurality of output voltages.

The thermopile 16 is formed by orienting the thermobundle sets 58 with their lead wires 64A and 66A extending in the same direction, and arranging them in a generally solid cylindrical pattern.

The portion of the thermopile in which the lead wires 64A and 66A are located is attached to the inner circumference of the ring 46, preferably by the silicon elastomer coating, and the ends of the lead wires 64A and 66A are disposed radially on the plate 50. The tap-off leads 28 extend through the gaps defined by the spacers to the output connection.

The space between the plate 50, the spacers 52, the lower surface of the ring 46, and the lower end of the core 68 is filled with a resilient adhesive having low thermal resistivity, preferably a suitable silicon elastomer.

A generally cylindrical fuel capsule holder 74 is securely mounted on the upper end of the thermopile 16, preferably by a silicon elastomer adhesive, and includes a recess 76 in its lower surface into which the upper end of the thermopile projects. The fuel capsule holder, which is formed of a material with low thermal resistivity, includes a chamber 77 into which the fuel 24, contained in a fuel capsule 78, may be inserted, as through the fuel access port 34, and a suitably threaded chamber closure 79 seated at its upper end. The fuel capsule 78 is formed of a material which is corrosion resistant and has low thermal resistivity such as aluminum. The fuel is a quantity of a radioactive isotope having an appropriate half life and surface temperature, Pu 238 having been found to be highly satisfactory.

The thermal insulation 30, which fills that portion of the space within the housing 10 which is not occupied by the generator assembly 14 and the tap-off leads 28, is preferably formed of a material having rigidity, low density, and a high thermal resistivity which is not dependent on vacuum conditions at the operating temperatures of the generator. It comprises a lower portion 80 which extends from the lower end 42 of the housing 10 to a point above the bottom of the fuel capsule holder 74, an upper portion 82 which extends from such point to the top wall 32 of the housing 10, and a plug 84, which is disposed between the closure 79 and the fuel access port 34 and is adapted to be removed from the housing 10 through the fuel access port so that the fuel capsule 78 may be inserted in the chamber. This division of the thermal insulation permits the generator to be assembled by mating the lower portion 80 to the lower part of the generator assembly 14 and inserting the lower portion and generator assembly in the housing 10 from the top, then inserting the upper portion 82 and plug 84 and attaching the top wall 36 of the housing 10. The thermal insulation 30 is impregnated with an inert gas, preferably argon, to exclude oxygen and water vapor.

Figures 3, 5:
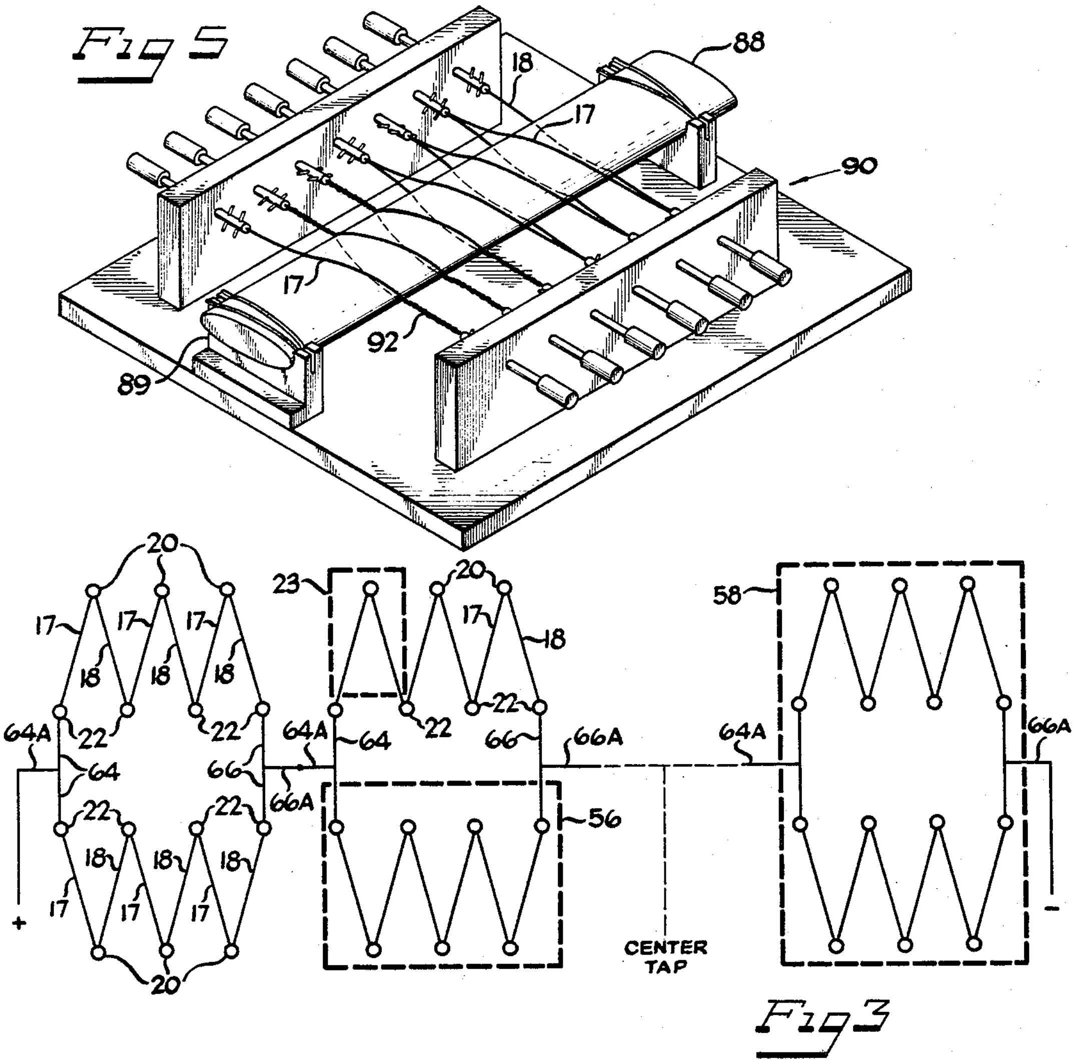
FIGURE 3 is a diagrammatic representation of certain features of the invention otherwise illustrated in FIGURES 1 and 2.
FIGURE 4 is a longitudinal sectional view of a thermal junction of the generator of FIGURES 1 and 2 and FIGURE 5 is a perspective view of an apparatus useful in constructing the generator shown in FIGURES 1–3.
Figure 4:
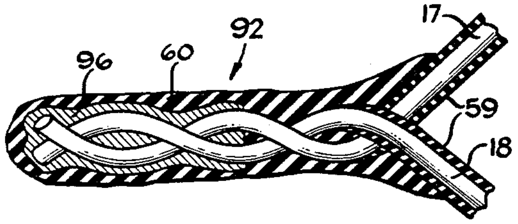

Referring now to FIGURES 4 and 5, the thermobundles 56 are preferably constructed by lacing N-type elements 18 covered with a coating 59 of electrical insulation on a processing jig 90, placing a processing mandrel 88 over said N-type elements in brackets 89 of the processing jig 90 and lacing P-type elements 17 covered with a coating of insulation 59 over said mandrel on the processing jig. End portions of the elements 17 and 18 are then twisted together by suitable means located on the fixture to form twisted end portions 92. The mandrel 88 and the interconnected thermoelements then are removed from the fixture 90. The ends of the interconnected thermoelements are exposed, as by sand blasting under a low pressure while the remainder of the elements are masked. The twisted end portions 92 are subsequently covered with a suitable solder 96, preferably silver solder using a dip brazing technique, and the soldered ends 92 are covered with electrical insulation 60, preferably with a suitable silicon elastomer using a spray technique. A plurality of thermoelement pairs 23, connected in series and individually covered with electrical insulation 59 and 60 along their lengths and at their junctions 20 and 22, is thereby formed.

The thermoelement pairs 23 then are moved longitudinally together along the mandrel into a compact condition and are then removed from the mandrel. The resulting group of thermoelectric pairs is subsequently covered with a suitable resilient silicon elastomer, as previously mentioned, to form a compact elongated bundle. The lead wires 64 and 66 are electrically connected to the two end wires of the bundle by twisting the end wires around the lead wires, removing the electrical insulation and soldering.

The cold junctions 22 of the thermoelement pairs are defined by the position of attachment of the lead wires 64 and 66. The entire bundle comprising the thermoelement pairs and the lead wires and covered by resilient electrical insulation, preferably a suitable silicon elastomer, thus forms a thermobundle 56. The lead wire 64 which is connected to a P-type element 17 is identified by applying heat to the hot end of the bundle and observing the deflection of an electrical meter.

One specific set of representative parameters for an embodiment of the thermoelectric generator contemplated by the present invention is set forth in Table I. It should be considered that the data contained in this table is merely illustrative of certain of the features of the invention and should not be construed as limiting the invention to specific structural materials or operating conditions.

TABLE I

Data for thermoelectric generator

| | |
|---|---|
| Power output | 1.75 milliwatts. |
| Open-circuit voltage | 8.70 volts. |
| Load voltage | 6.28 volts. |
| Load voltage change during ambient temperature change of −65° F. to 165° F. to −65° F. in less than 5 minutes | 0.68 volts. |
| Load resistance | 22,500 ohms. |
| Generator resistance | 8660 ohms. |
| Thermal input | 1.65 watts. |
| Hot junction to cold junction temperature difference | 300 F. degrees. |
| Over-all efficiency | 0.116%. |
| Bypass heat loss | 58%. |
| Geometry | Cylinder. |
| Diameter | 2.5 in. |
| Length | 5.0 in. |
| Weight | 0.85 lb. |
| Thermopile: | |
| P-type element material | Chromel-P. |
| N-type element material | Constantan. |
| P and N-type element diameters | 2.0 mils. |
| Element length | 1.5 in. |
| Hot-junction temperature | 400° F. |
| Cold-junction temperature | 100° F. |
| Number of thermoelement pairs | 1300. |
| Number of thermobundles | 52. |
| Number of thermobundle sets | 26. |
| Number of parallel circuit paths | 2. |
| Materials: | |
| Fuel | Pu–238. |
| Thermal insulation (manufactured by Johns-Manville Corp.) | Min–K–503. |
| Electrical insulation | Varnish and silicon rubber. |
| Housing | Aluminum-epoxy resin sealed. |
| Thermal capacitor | 316 stainless steel. |

Various changes and modifications may be made in the above described thermoelectric generator without departing from the invention. For example, modifications in the form or structural arrangement of the components of the generator in the nature of the source of heat or in the materials from which the components are fabricated could be effected which would fall within the spirit and scope of the present invention, various features of which are set forth in the accompanying claims.

What is claimed is:

1. A thermoelectric generator comprising an elongated thermopile formed of a plurality of interlaced thermoelectric elements adapted to generate electricity when opposite ends thereof are subjected to different temperatures, means maintaining said opposite ends at different temperatures, and means minimizing the difference in the time rates of change of temperature of said ends of said thermopile incident to ambient temperature changes so as to stabilize the power produced by the generator.

2. A thermoelectric generator comprising an elongated thermopile formed of a plurality of interlaced thermoelectric elements adapted to generate electricity when opposite ends thereof are subjected to different temperatures, means supplying heat to one of the ends of said thermopile, means removing heat from the opposite end of said thermopile, and means operating in conjunction with said heat supplying means and said heat removing means to maintain said one end at a higher temperature than said opposite end and to minimize the difference in the time rates of change of temperature of said ends of said thermopile incident to ambient temperature changes so as to stabilize the output voltage and the power produced by the generator.

3. A thermoelectric generator comprising an elongated thermopile formed of a plurality of interlaced thermoelectric elements adapted to generate electricity when opposite ends thereof are subjected to different temperatures, means supplying heat to one of the ends of said thermopile, means removing heat from the opposite end of said thermopile, means providing resistance to the flow of heat from said one end to said opposite end of said thermopile so as to maintain said one end at a higher temperature than said opposite end, and means providing thermal capacitance adjacent to said opposite end of said thermopile such that the product of the thermal capacitance and the thermal resistance at said opposite end approximates the product of the thermal capacitance and the thermal resistance at said one end, thereby minimizing variations in the power produced by the generator during ambient temperature changes.

4. A thermoelectric generator comprising a housing, an electrical output connection mounted on said housing, an elongated thermopile formed of a plurality of interlaced thermoelectric elements enclosed within said housing, said thermopile being adapted to generate electricity when opposite ends thereof are subject to different temperatures, means electrically connecting said thermopile to said electrical output connection, means supplying heat to one of the ends of said thermopile, means removing heat from the opposite end of said thermopile, and means operating in conjunction with said heat supplying means and said heat removing means to maintain said one end at a higher temperature than said opposite end and to minimize the difference in the time rates of change of temperature of said ends of said thermopile incident to ambient temperature changes so as to stabilize the power produced by the generator.

5. A thermoelectric generator comprising a housing, an electrical output connection mounted on said housing, an elongated thermopile formed of a plurality of interlaced thermoelectric elements enclosed within said housing, said thermopile being adapted to generate electricity when opposite ends thereof are subjected to different temperatures, means electrically connecting said thermopile to said electrical output connection, means supplying heat to one of the ends of said thermopile, means removing heat from the opposite end of said thermopile, means providing resistance to the flow of heat from said one end to said opposite end of said thermopile so as to maintain said one end at a higher temperature than said opposite end, and means providing thermal capacitance adjacent to said opposite end of said thermopile such that the product of the thermal capacitance and the thermal resistance at said opposite end approximates the product of the thermal capacitance and the thermal resistance at said one end, thereby minimizing variations in the power produced by the generator during ambient temperature changes.

6. A thermoelectric generator comprising a housing; an electrical output connection mounted on said housing; a generator assembly enclosed within said housing, said generator assembly including an elongated thermopile formed of a plurality of interlaced thermoelectric elements adapted to generate electricity when opposite ends thereof are subjected to different temperatures, an electric output connection mounted on said housing, means supplying heat to one of the ends of said thermopile, and a member substantially surrounding the opposite end of said thermopile and in contact with said housing, said member having low thermal resistance so as to thermally connect said opposite end to said housing; and a body occupying the space between said generator assembly and said housing, said body having high thermal resistance so as to minimize the flow of heat from said heat supplying means to said housing and said opposite end of said thermopile, thereby maintaining said one end at a higher temperature than said opposite end; said member and said body each having thermal capacitances such that the product of the total thermal capacitance and the thermal resistance at said opposite end approximates the product of the total thermal capacitance and the thermal resistance at said one end thereby minimizing variations in the power produced by the generator during ambient temperature changes.

7. A thermoelectric generator comprising a housing; an electrical output connection mounted on said housing; a generator assembly enclosed within said housing, said generator assembly including an elongated thermopile adapted to generate electricity when opposite ends thereof are subjected to different temperatures, said thermopile comprising a plurality of thermobundle sets electrically connected in series, each of said thermobundle sets comprising a plurality of elongated thermobundles disposed longitudinally in said thermopile and electrically connected in parallel, each of said thermobundles comprising an external coating binding together a plurality of thermoelement pairs electrically joined in series at first thermal junctions disposed at one end of said thermopile, said first thermal junctions being electrically insulated from each other, each of said thermoelement pairs comprising an elongated P-type thermoelectric element and an elongated N-type thermoelectric element electrically joined at second thermal junctions disposed at the opposite end of said thermopile, said second thermal junctions being electrically insulated from each other; means electrically connecting said thermopile to said electrical output connection; means supplying heat to one of the ends of said thermopile; a member substantially surrounding the opposite end of said thermopile and in contact with said housing, said member having low thermal resistance so as to thermally connect said opposite end to said housing; and a body occupying the space between said generator assembly and said housing, said body having high thermal resistance so as to minimize the flow of heat from said heat supplying means to said housing and said opposite end of said thermopile, thereby maintaining said one end at a higher temperature than said opposite end; said member and said body each having thermal capacitances such that the product of the thermal capacitance and the thermal resistance at said opposite end approximates the product of the thermal capacitance and the thermal resistance at said one end, thereby minimizing variations in the power produced by the generator during ambient temperature changes.

8. A thermoelectric generator comprising a hermetically sealed housing; an electrical output connection mounted on said housing; a generator assembly enclosed within said housing, said generator assembly including an elongated thermopile formed of a plurality of interlaced thermoelectric elements adapted to generate electricity when opposite ends thereof are subjected to different temperatures, means electrically connecting said thermopile to said electrical output connection, means supplying heat to one of the ends of said thermopile, and a member substantially surrounding the opposite end of said thermopile and in contact with said housing, said member having low thermal resistance so as to thermally connect said opposite end to said housing; and a body occupying the space between said generator assembly and said housing, said body having high thermal resistance so as to minimize the flow of heat from said opposite end of said thermopile, thereby maintaining said one end at a higher temperature than said opposite end; said member and said body each having thermal capacitances such that the product of the thermal capacitance and the thermal resistance to the housing at said opposite end approximates the product of the thermal capacitance and the thermal resistance to the housing at said one end, thereby minimizing variations in the power produced by the generator during ambient temperature changes.

9. A thermoelectric generator comprising a housing; an electrical output connection mounted on said housing; a generator assembly enclosed within said housing, said generator assembly including an elongated thermopile formed of a plurality of interlaced thermoelectric elements adapted to generate electricity when opposite ends thereof are subjected to different temperatures, means electrically connecting said thermopile to said electrical output connection, means thermally connected to one end of said thermopile and adapted to receive fuel for supplying heat to said end, a member substantially surrounding the opposite end of said thermopile and in contact with said housing, said member having low thermal resistance so as to thermally connect said opposite end to said housing; and a body occupying the space between said generator assembly and said housing, said body having high thermal resistance so as to minimize the flow of heat from said heat supplying means to said housing and said opposite end of said thermopile, thereby maintaining said one end at a higher temperature than said opposite end; said member and said body each having thermal capacitances such that the product of the total thermal capacitance and the thermal resistance at said opposite end approximates the product of the total thermal capacitance and the thermal resistance at said one end, thereby minimizing variations in the power produced by the generator during ambient temperature changes.

10. A thermoelectric generator comprising a housing; an electrical output connection mounted on said housing; a generator assembly enclosed within said housing, said generator assembly including an elongated thermopile formed of a plurality of interlaced thermoelectric elements adapted to generate electricity when opposite ends thereof are subjected to different temperatures, means electrically connecting said thermopile to said electrical output connection, means supplying heat to one of the ends of said thermopile, and a member substantially surrounding the opposite end of said thermopile and attached to said housing, said member having low thermal resistance so as to thermally connect said opposite end to said housing; and a body occupying the space between said generator assembly and said housing, said body having high thermal resistance so as to minimize the flow of heat from said heat supplying means to said housing and said opposite end of said thermopile, thereby maintaining said one end at a higher temperature than said opposite end; said member and said body each having thermal capacitances such that the produce of the thermal capacitance and the thermal resistance at said opposite end approximates the product of the thermal capacitance and the thermal resistance at said one end, thereby minimizing variations in the power produced by the generator during ambient temperature changes; said member and said body having rigidity and structural strength so as to support said generator assembly and strengthen said housing.

References Cited

UNITED STATES PATENTS

| | | | |
|---|---|---|---|
| 1,605,860 | 11/1926 | Snelling | 136—224 |
| 2,526,112 | 10/1950 | Biggle | 136—220 |
| 2,913,510 | 11/1959 | Birden et al. | 136—202 |
| 3,026,363 | 3/1962 | Batteau | 136—226 |
| 3,347,711 | 10/1967 | Banks et al. | 136—205 X |
| 3,348,978 | 10/1967 | Teague | 136—224 X |

ALLEN B. CURTIS, *Primary Examiner.*